A. PUSTERLA.
TRANSMISSION MECHANISM.
APPLICATION FILED JUNE 28, 1909.

950,055.

Patented Feb. 22, 1910.
2 SHEETS—SHEET 1.

Witnesses
Jesse N. Lutton
R. V. Sommers

Inventor
Attilio Pusterla
By

Attorney

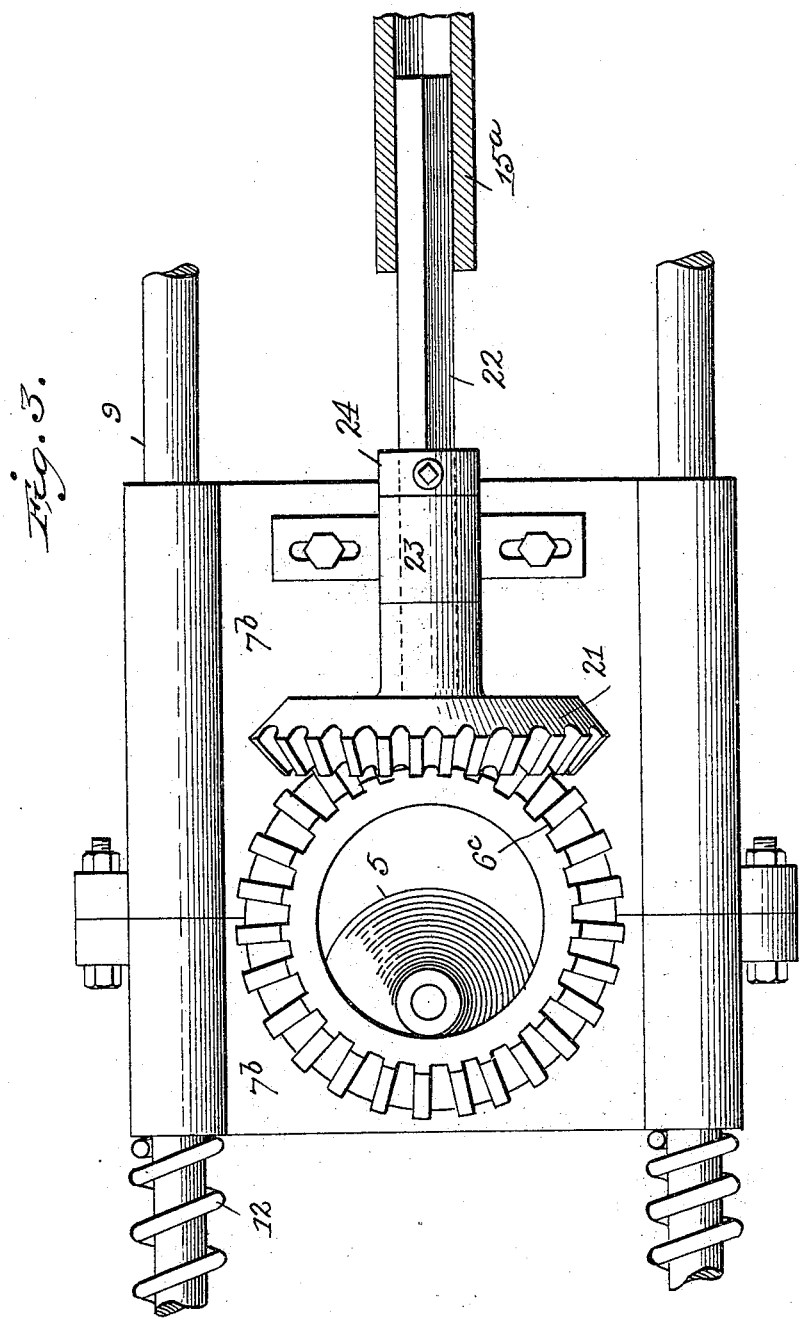

UNITED STATES PATENT OFFICE.

ATTILIO PUSTERLA, OF BATHBEACH, NEW YORK, ASSIGNOR OF ONE-HALF TO SAMUEL SCHENKEIN, OF NEW YORK, N. Y.

TRANSMISSION MECHANISM.

950,055.          Specification of Letters Patent.     Patented Feb. 22, 1910.

Application filed June 28, 1909. Serial No. 504,876.

*To all whom it may concern:*

Be it known that I, ATTILIO PUSTERLA, a citizen of the United States, residing at Bathbeach, Long Island, New York, have invented certain new and useful Improvements in Transmission Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to power transmission mechanism and has for its object to provide means for gradually transmitting the speed of the power shaft to the driven shaft thereby overcoming the sudden starting and jerking incident in many mechanisms of this character.

With this object in view the invention consists of a power transmission member such as a sprocket, pulley or gear surrounding the power shaft and yieldingly held eccentric thereto, said power transmission member being positively connected with the driven shaft, by any appropriate mechanism and frictionally connected with the power shaft by means of a conical driving member slidably mounted on, rotatable with and concentric to the power shaft, means being provided to yieldingly hold the transmission member eccentric to the power shaft so that the increasing periphery of the cone may be brought into engagement with the interior periphery of said power transmission member.

The invention consists also in details of construction and combination of parts as hereinafter more particularly set forth and then specified in the claims.

Figure 1:
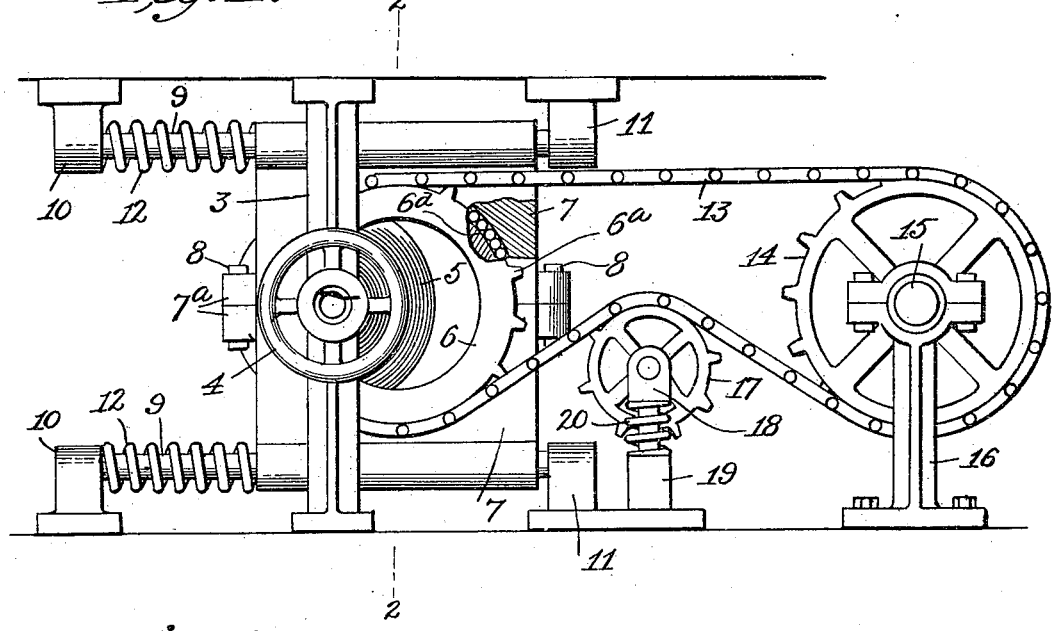
Figure 2:
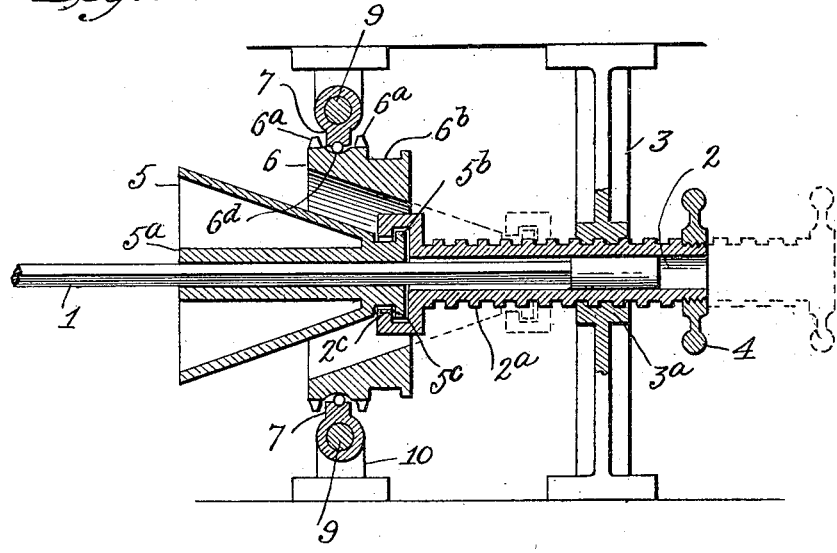
Figure 2:

In the accompanying drawings: Figure 1 is a side elevation of a power transmission mechanism illustrating one form of power transmission member and means for connecting the same with the driven member. Fig. 2 is a longitudinal vertical section on the line 2—2 of Fig. 1. Fig. 3 is a side elevation of a modified form of transmission member and mechanism for connecting the same with the member to be driven.

Referring particularly to said drawing, the power shaft 1 is connected at one end in any suitable manner with any approved form of motor, not shown, and is journaled at its other end in a sleeve 2 which is mounted in a stationary standard 3. The sleeve 2 may be rotated in the standard by means of a hand wheel 4 and moved longitudinally by peripheral screw threads 2ᵃ working in threads formed in the bearing 3ᵃ of the standard. The shaft 1 is preferably made rectangular in cross section, except at its journal end, for the purpose of serving as a slide-way for a conical driving member 5, which has an internal sleeve 5ᵃ conforming to the configuration of the shaft. The conical member may, however, be splined on the shaft or connected thereto in any other suitable manner to permit longitudinal movement of said member and to insure its rotation with the shaft. The longitudinal movement of the conical member is effected by the sleeve 2, which is connected to said conical member in a manner to permit independent rotation of the two parts, said connection being preferably formed by means of an annular flange 2ᶜ formed on the sleeve 2 and projecting between a flange 5ᵇ and shoulder 5ᶜ formed on one end of the sleeve 5ᵃ.

Surrounding the conical driving member 5, is a transmission or driven member 6, which may consist of a sprocket wheel, as shown in Fig. 1, having one or more rows of peripheral teeth, as 6ᵃ, or a lateral belt surface 6ᵇ, or both; or, as shown in Fig. 3, it may consist of a bevel gear, as 6ᶜ. The transmission or driven member 6 is mounted in a slide, which consists of two plates, 7, 7, each having a semicircular recess in one edge, so that when the plates are secured together by bolts 8 taking through flanges 7ᵃ the plates surround the driven member. The semi-circular edges are grooved and coöperate with a groove 6ᵈ formed in the center of the periphery of the member 6 to form a raceway for anti-friction bearing balls. The plates 7, 7, are slidably mounted on parallel guide-rods 9, 9, fixed transversely to the shaft 1 in brackets 10 and 11, and between one end of the plates and the brackets 10 are interposed springs 12 which surround the guide rods 9, and have a tendency to hold the plates away from said brackets 10 and to yieldingly hold the transmission or driven member 6 into contact with the conical driving member 5.

As shown in Fig. 1, the transmission or driven member 6, is connected by a sprocket chain 13, with a sprocket-wheel 14 fixed on the shaft 15 to be driven, which latter is journaled in a fixed standard 16. The chain 13 is kept taut, irrespective of the relative distance between the member 6 and the sprocket 14, by means of an idle sprocket wheel 17 which is journaled in a standard 18 slidably mounted in a socket 19 situated between said member 6 and sprocket 13; the sprocket 17 being yieldably held against the chain by the action of a coiled spring 20 surrounding the standard.

As previously stated, the transmission member 6 is held in constant contact with the conical member by the action of the springs 9, and when the member 5 is in the position shown in Fig. 2, the smallest portion of the latter is in engagement with the member 6, hence the speed of the driven shaft will be much slower than that of the power shaft. It will readily be seen that the speed of the member 6 and, consequently, that of the driven shaft, may be gradually increased and finally brought to the speed of the power shaft by moving the member 5 through the member 6, as indicated in dotted lines, which movement is effected by rotating the sleeve 2 by means of the hand wheel 4.

In the modification shown in Fig. 3, the transmission member consists of a bevel-gear 6ᶜ mounted in slide-plates 7ᵇ in the same manner as the member 6, said plates being substantially like the plates 7. In this instance the rotation of member 6ᶜ is transmitted to a shaft 15ᵃ through the medium of a bevel-gear 21 and shaft 22; the gear 21 meshing with the member 6ᶜ is fixed on the shaft 22 which is journaled in a bearing 22 on one of the slide plates, and said shaft 22 is connected to and moved longitudinally with the slide plates by a collar 24 fixed to the shaft, and the hub of the gear 21 engaging the bearing 23. A telescoping connection is formed between shafts 15ᵃ and 22, and they are caused to rotate together, preferably by forming the outer periphery of shaft 22 and the bore of shaft 15ᵃ rectangular in cross section.

The conical driving member 5, in Fig. 3, is constructed and operated the same as that hereinbefore described, so that when said member 5 is moved through the member 6ᶜ a lateral movement is imparted to the latter and to the slide plates 7ᵇ causing the shaft 22 to slide within shaft 15ᵃ.

I claim—

1. In a transmission mechanism, a rotatable axially slidable driving member, a slide movable transversely to and operable by the latter and an annular driven member mounted in the slide and surrounding the driving member.

2. In a transmission mechanism, a rotatable axially slidable conical driving member, a slide movable transversely to and operable by the latter, and an annular driven member mounted in the slide and surrounding the driving member.

3. In a transmission mechanism, a rotatable axially slidable conical driving member, a slide movable transversely to the latter, an annular driven member rotatable in the slide and surrounding the conical member, and means to yieldingly hold the annular member eccentric to the conical member.

4. In a transmission mechanism, a rotatable axially slidable conical driving member, a slide movable transversely to and automatically operable by the latter, an annular driven member rotatable in the slide and surrounding the conical member, a driven shaft, and means to connect the latter with the annular member.

5. In a transmission mechanism, a rotatable axially slidable conical driving member, a slide movable transversely to the latter, an annular driven member rotatable in the slide and surrounding the conical member, a driven shaft, means to connect the latter with the annular member and means to yieldingly hold the annular driven member eccentric to the conical member.

6. In a transmission mechanism, a conical driving member, a driven member, an annular friction member surrounding the driving member and movable by the latter transversely thereto, a driving connection between the friction and driven members, and means to compensate for the movement of the friction member.

7. In a transmission mechanism, a power shaft, a conical driving member slidable thereon and rotatable therewith, a driven member, a slide movable transversely to the power shaft, an annular driven member rotatable in the slide and surrounding the conical member, means to connect the annular member and driven member, and means to yieldingly hold the annular member eccentric to the power shaft.

8. In a transmission mechanism, a power shaft, a conical driving member slidable thereon and rotatable therewith, guide rods mounted transversely of the shaft, plates slidably mounted on the guide rods having a semi-circular grooved recess in their edges, an annular transmission member mounted in said recesses and having a grooved periphery registering with the aforesaid grooves forming a race-way, anti-friction balls mounted in the race-way, and means to yieldingly press the transmission member against the conical member.

9. In a transmission mechanism, the combination with a fixed bearing having internal screw-threads; of a sleeve journaled therein having peripheral screw-threads engaging the threads of the bearing, a power shaft journaled in the sleeve, a conical driving member having an internal bearing sleeve slidably mounted on the shaft and rotatable therewith and having an end flange engaged by an annular flange on the sleeve, an annular transmission member surrounding the conical member, and means to yieldingly mount the transmission member to move transversely to the conical member.

In testimony that I claim the foregoing as my invention, I have signed my name in presence of two subscribing witnesses.

ATTILIO PUSTERLA.

Witnesses:
 PLACIDO MORI,
 JAS. F. CARAGUARO.